United States Patent [19]

Spreckelmeyer

[11] 3,906,074

[45] Sept. 16, 1975

[54] PROCESS FOR CHLORINATING COPPER SULFIDE MINERALS

[75] Inventor: Bernhard W. Spreekelmeyer, Leverkusen, Germany

[73] Assignee: Kennecott Copper Corporation, New York, N.Y.

[22] Filed: July 12, 1973

[21] Appl. No.: 378,787

Related U.S. Application Data

[63] Division of Ser. No. 131,947, April 7, 1971, Pat. No. 3,832,440.

[52] U.S. Cl. .................................. 423/40; 423/493
[51] Int. Cl.² .......................................... C01G 3/04
[58] Field of Search ............................. 423/40, 493

[56] References Cited
UNITED STATES PATENTS

| | | | |
|---|---|---|---|
| 846,657 | 3/1907 | Frolich | 423/40 X |
| 2,367,153 | 1/1945 | Swinchart et al. | 423/493 |

Primary Examiner—Edward Stern
Attorney, Agent, or Firm—Mallinckrodt & Mallinckrodt

[57] ABSTRACT

A substantially dry intimate mixture of copper sulfide mineral concentrate and an added diluent material is contacted with at least a stoichiometric amount of chlorine relative to chlorinatable compounds of such materials at a temperature of between 300°C. and 400°C. to produce a reaction product containing water-soluble cupric chloride. Sulfur and iron values present in the mixture are substantially completely volatilized. Typical diluent materials are chlorinatable iron compounds, gangue materials, silica sand, and carbon. A portion of the diluent can be already present in the copper sulfide material, for example gangue components of a copper sulfide mineral concentrate, with the rest of the necessary diluent being added to form the mixture. The cupric chloride product recovered from the water-insoluble residue in the reaction product, as by means of water leaching, is substantially uncontaminated by sulfur or iron values.

4 Claims, 1 Drawing Figure

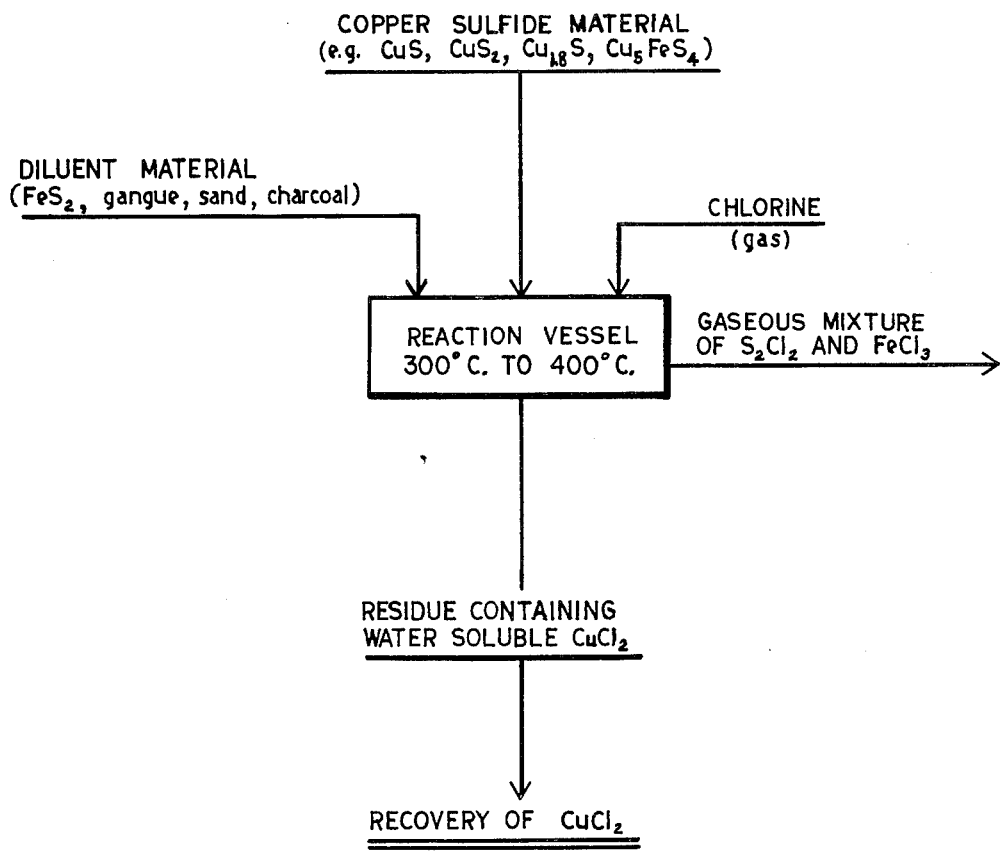

PROCESS FOR CHLORINATING COPPER SULFIDE MINERALS

The present application is a divisional of my copending application Ser. No. 131,947 filed Apr. 7, 1971, now U.S. Pat. No. 3,832,440, issued Aug. 27, 1974.

BACKGROUND OF THE INVENTION

1. Field

This invention relates to the extraction of copper values from copper sulfide materials, and more particularly to a process for chlorinating copper sulfide to produce water-soluble cupric chloride.

2. State of the Art

Many processes have been proposed for treating copper sulfide ores, particularly in the form of concentrates, to extract the copper values contained therein. In addition to the conventional processes for smelting copper-bearing concentrates, various proposals have been made for exposing copper sulfide materials to chlorine. Some of the chlorination processes are known as wet processes because they treat a copper sulfide material in the form of an aqueous slurry. Other processes treat a copper sulfide material in a dry state, but convert the copper values to water-insoluble cuprous chloride ($Cu_2Cl_2$) contaminated with insoluble iron and sulfur values. Still other processes employ a combination of dry and wet extraction techniques. All of the known chlorination processes suffer from at least two major disadvantages. We have found that, in the absence of sufficient diluent material, such as iron pyrite or gangue, the chlorination of the copper values is incomplete, leaving insoluble copper values in the reaction product. Moreover, significant amounts of the copper values which are extracted are volatilized and lost at reaction temperatures of over 400°C. The reaction product also contains appreciable amounts of contaminating sulfur and iron values which are separated from the copper values only with difficulty and at great expense.

3. Objective

It was an objective in the development of this invention to extract substantially all the copper values contained in a copper sulfide material as a cupric chloride product containing substantially no contaminating sulfur or iron values.

SUMMARY OF THE INVENTION

In accordance with the invention, copper values are extracted from copper sulfide minerals, such as ore concentrates, by contacting a dry, intimate mixture of such a copper sulfide mineral and a diluent material with at least a stoichiometric amount of chlorine at a temperature of between about 300°C. and about 400°C. The reaction extracts substantially all of the copper values and produces a reaction product containing water-soluble cupric chloride ($CuCl_2$), which can be leached from the residue and recovered by conventional means. Sulfur and any chlorinatable iron values present in the mixture are substantially completely volatilized as chlorides during the reaction.

Diluent materials suitable for use in the process comprise chlorinatable iron values, such as iron pyrites ($FeS_2$), gangue materials normally present in an ore, silica sand, carbon, etc. A portion of the diluent material utilized as such in the mixture can be initially present as gangue in the copper sulfide material itself. Under such circumstances, only the additional diluent necessary for the reaction is added to the sulfide material to form the desired mixture. Complete conversion of copper values to cupric chloride is achieved if sufficient diluent, such as a chlorinatable iron compound, is added to the copper sulfide material to form a mixture having a molar ratio of at least 1:1 iron to copper. The other diluents are freely interchangeable with the iron either in part or in whole. The utilization of diluent materials other than iron compounds substantially eliminates any volatilization loss of copper values. Volatilization of the sulfur values, and iron values if present, permits the direct recovery of at least 99.9% of the cupric chloride in the reaction product by water leaching.

THE DRAWING

The best mode presently contemplated for carrying out the invention is illustrated in the accompanying drawing, in which the single FIGURE is a flowsheet showing the process as applied to copper sulfide materials to produce uncontaminated cupric chloride.

DETAILED DESCRIPTION OF THE ILLUSTRATED PROCEDURE

As illustrated in the attached flowsheet, the process of the invention is carried out by reacting a dry, intimate mixture of a copper sulfide mineral and a diluent material with at least a stoichiometric amount of chlorine gas at a temperature of between 300°C. and 400°C. to react with substantially all contained copper, iron, and sulfur values to produce a reaction product containing uncontaminated, water-soluble cupric chloride. The resulting iron and sulfur chlorides leave the reaction in the gaseous state.

The process can be used with minerals, such as covellite ($CuS$), chalcocite ($Cu_2S$), digenite ($Cu_{1.8}S$), and bornite ($Cu_5FeS_4$), in the form of an ore concentrate. The material can be in any physical form or have any particle size capable of reacting with chlorine. The most efficient results are obtained if the sulfide material is crushed to a fine particle size, as it is in the usual ore concentrate, to permit rapid and complete reaction between the copper sulfide and the chlorine.

It is essential that a diluent material be present to ensure complete conversion of the copper values to cupric chloride. It has been found that chlorinatable iron compounds (such as iron pyrites), gangue materials, silica sand and activated carbon are all effective in the process and are interchangeable with each other. Part of the diluent material may be initially present in the concentrated copper sulfide minerals to be processed. In such a situation, the remaining diluent is added to the copper sulfide concentrate to form the necessary mixture. For example, bornite ($Cu_5FeS_4$) contains both copper and iron values. If the reaction with the chlorine is to proceed to completion with the chlorination of substantially all of the copper and iron values, the molar ratio of iron to copper should be at least 1:1. Accordingly, additional chlorinatable iron-bearing material, such as iron pyrite, is mixed with the bornite to achieve the desired molar ratio. Lower molar ratios will be effective in providing correspondingly smaller amounts of water-soluble copper chlorides and volatile iron chloride.

Similar results are attained in the process when activated carbon, quartz sand, or gangue materials, such as that contained in copper sulfide mill heads or tailings, are employed as the diluent material in place of, or in addition to, the iron-bearing material. Weight ratios of a copper sulfide mineral, such as covellite, to quartz sand, gangue, or activated charcoal of from 1:1 to 1:4 were found to provide virtually complete chlorination. If less than complete chlorination is acceptable for the particular conditions or materials to be employed, lower ratios can be used to provide acceptable results with less than complete conversion of the copper values to cupric chloride.

The process produces not only cupric chloride as a water-soluble product, but also results in the formation of volatile by-products, sulfur chloride ($S_2Cl_2$) and ferric chloride ($FeCl_3$). The volatile chloride compounds are drawn off from the reaction and do not remain in the reaction product as contaminants. The presence of diluent materials, such as water-insoluble gangue, sand, or charcoal in the reaction product does not appreciably affect the solubilization of cupric chloride. Recovery of the cupric chloride from the reaction product is easily brought about by conventional means, such as water-leaching, followed by separation of the pregnant solution from the residue and precipitation of the copper values from solution.

As noted in the accompanying examples, the reaction is best carried out under controlled conditions in which such variables as the temperature and the amount of chlorine can be regulated. For example, the reaction can be carried out in a closed reaction vessel which has been flushed with nitrogen before introducing the chlorine.

The chlorine used in the process is in the form of a gas and must be present in an amount at least stoichiometrically equivalent to the amount of copper, sulfur, and iron present in the mixture to be subjected to chlorination. Preferably, greater than stoichiometric amounts of chlorine are used. Less than stoichiometric amounts result in the formation of the intermediate, water-insoluble cuprous chloride ($Cu_2Cl_2$), which remains as a contaminant in the reaction product. The chlorine can be introduced in any conventional manner, including countercurrent to the sulfide material or flowing over a stationary bed of the copper sulfide in a closed reaction vessel. The presence of air or nitrogen mixed with the chlorine is acceptable and has no deleterious effects. However, water or water vapor is undesirable.

The chlorination reaction is exothermic and requires the introduction of heat only to start the reaction. The temperature of the reaction is maintained below about 400°C. to reduce the amount of volatilization of copper values and to avoid the formation of acid-soluble cuprous chloride. The temperature is held above about 300°C. to ensure complete volatilization of ferric chloride and the complete chlorination of the copper values. A temperature variance of about 3°– ° outside the range of 300° – 400°C. is acceptable. As a result of the exothermic nature of the reaction, it is preferred that the starting temperature lie within the range of about 300° to 360°C., although higher starting temperatures can be used. At a starting temperature of about 330°C. the maximum reaction temperature can increase to a point within the range of about 380° to about 400°C. Depending on the size equipment employed in the process and the ability of the equipment to conserve heat, provision will often have to be made for cooling the reaction to maintain a temperature below 400°C.

The temperature of the reaction is maintained as low as possible below 400°C. (but above 300°C.) to reduce the amount of volatilization of copper chloride. Moreover, the intermediate cuprous chloride ($Cu_2Cl_2$) melts at about 430°C. The presence of molten $Cu_2Cl_2$ would hinder further chlorination if the temperature were permitted to reach that level. Under optimum conditions, as little as 1 percent of the original copper values are volatilized, and 99.9 percent of the copper chlorides in the reaction product are recovered as water-soluble cupric chloride. The selection of the precise temperature within the 300° – 400°C. range is influenced by four factors: (1) the completeness of the chlorination of copper values; (2) the volatility of copper values during the reaction; (3) the volatility of ferric chloride; and (4) the formation of undersirable cuprous chloride. These factors are also influenced by the type of diluent material employed, as has been explained hereinbefore.

The following examples illustrate the process of the invention, and are not intended to limit the scope of the invention.

EXAMPLES

Forty-one tests were conducted employing mixtures of different copper sulfide materials and concentrations of iron-bearing materials, gangue, quartz sand, and activated carbon. The temperature of each test is shown in the accompanying tables in addition to the data showing the completeness of chlorination of the copper values, volatilization of iron values and amount of copper values recovered from the reaction product. For each test, 20 grams, plus or minus 5 grams, of the starting material were used. The chlorination took place in a closed chlorination tube with an excess of chlorine gas for 270 minutes, plus or minus 30 minutes. The data for tests using a variety of copper sulfide minerals in their pure states are set forth in Table I. Table II provides the data for three types of copper sulfide concentrates.

TABLE 1

CHLORINATION OF CHALCOCITE, DIGENITE, AND COVELLITE: INFLUENCE OF DILUENT MATERIALS ON CHLORINATION

| Test No. | Starting Material Constituents, Weight Ratio | Ratio Fe/Cu | Test Data Temperature °C $T_{start}$ | $T_{max}$ | Chlorinated Residue Percent Cu | Fe | S | Volatilized Copper Percent of $Cu_{start}$ | Residue Leach Cu Distribution in: $H_2O$ | HCl | Residue | Soluble Copper: % of Cu start ± 2% $Cu^{2+}$ | $Cu^{1+}$ |
|---|---|---|---|---|---|---|---|---|---|---|---|---|---|
| 1 | $Cu_2S$ | 0.06 | 228 | 378 | 52.2 | 1.15 | 5.56 | — | — | — | — | — | — |
| 2 | $Cu_2S$ | .07 | 326 | 381 | 46.8 | 1.20 | .52 | 0.85 | 93.9 | 1.39 | 4.68 | 79.9 | 14.8 |
| 3 | $Cu_2S$ | .07 | 336 | 406 | 48.3 | 1.30 | .01 | 1.42 | 88.5 | 11.1 | .34 | 83.1 | 15.2 |

TABLE I —Continued

CHLORINATION OF CHALCOCITE, DIGENITE, AND COVELLITE: INFLUENCE OF DILUENT MATERIALS ON CHLORINATION

| Test No. | Starting Material Constituents, Weight Ratio | Ratio Fe/Cu | Test Data Temperature °C $T_{start}$ | $T_{max}$ | Chlorinated Residue Percent Cu | Fe | S | Volatilized Copper Percent of $Cu_{start}$ | Residue Leach Cu Distribution in: $H_2O$ | HCl | Residue | Soluble Copper: % of Cu start ± 2% $Cu^{2+}$ | $Cu^{1+}$ |
|---|---|---|---|---|---|---|---|---|---|---|---|---|---|
| 4 | $Cu_2S$ | .06 | 343 | 432 | 53.3 | 1.50 | .35 | 09.004 | 40.3 | 59.2 | .48 | 38.8 | 60.4 |
| 5 | $Cu_2S+FeS_2$, 1:0.75 | .67 | 349 | 395 | 44.8 | .40 | .04 | 1.29 | 99.92 | .08 | — | 89.4 | 9.3 |
| 6 | $Cu_2S+FeS_2$, 1:1.5 | 1.18 | 326 | 379 | 42.2 | 1.80 | .04 | 1.54 | 99.90 | .10 | .002 | 83.9 | 14.6 |
| 7 | $Cu_2S+FeS_2$, 1:1.5 | 1.15 | 336 | 381 | .60 | .04 | 1.84 | 99.98 | .02 | — | 91.6 | 6.6 | |
| 8 | $Cu_2S+FeS_2$, 1:1.15 | 1.15 | 351 | 409 | 44.6 | .40 | .03 | 2.10 | 99.96 | .04 | — | 90.8 | 7.1 |
| 9 | $Cu_2S$+Arthur Gen. Mill Heads, 1:1 | .12 | 327 | 404 | 27.2 | 1.20 | .01 | .15 | 99.88 | .11 | .007 | 99.5 | .3 |
| 10 | $Cu_2S$+Arthur Gen. Mill Tails, 1:1 | .11 | 326 | 390 | 27.2 | 1.30 | .01 | .13 | 99.85 | .14 | .007 | 100.6 | — |
| 11 | $Cu_2S$+Charcoal, 4:1 | .07 | 327 | 418 | 34.3 | 1.90 | .62 | .07 | 99.69 | .04 | .27 | 90.7 | 9.0 |
| 12 | $Cu_2S$+Quartz Sand I; 1:1 | .08 | 331 | 398 | 27.4 | .50 | 0.3 | .02 | 99.97 | .02 | .01 | 99.7 | .3 |
| 13 | $Cu_2S$+Quartz Sand I.1, 1:1 | .07 | 324 | 390 | 27.1 | .40 | .09 | .11 | 99.90 | .09 | .01 | 96.3 | 3.6 |
| 14 | $Cu_2S$+Quartz Sand I.2, 1:1 | .08 | 324 | 380 | 27.5 | .60 | .05 | .11 | 99.95 | .03 | .02 | 96.6 | 3.3 |
| 15 | $Cu_2S$+Quartz Sand I.3, 1:1 | .08 | 326 | 390 | 27.3 | .40 | .01 | .14 | 99.97 | .01 | .01 | 98.6 | 1.2 |
| 16 | $Cu_2S$+Quartz Sand I.4, 1:1 | .11 | 324 | 414 | 27.7 | .55 | .01 | .17 | 99.96 | .03 | .01 | 98.2 | 1.6 |
| 17 | $Cu_{1.8}S$ | .09 | 325 | 405 | 58.2 | 1.10 | 4.06 | .01 | 77.19 | 22.6 | .21 | 71.0 | 28.7 |
| 18 | $Cu_{1.8}S+FeS_2$, 1:0.8 | .60 | 325 | 380 | 45.2 | .84 | .01 | .39 | 99.99 | .01 | — | 98.7 | .9 |
| 19 | CuS | .003 | 327 | 386 | 53.3 | .40 | .13 | .02 | 60.39 | 9.90 | 29.7 | 50.0 | 22.3 |
| 20 | $CuS+FeS_2$, 1:1 | .79 | 328 | 360 | 44.4 | .90 | .61 | .66 | 99.92 | .02 | .06 | 97.4 | 1.8 |

TABLE II

CHLORINATION OF COPPER SULFIDE CONCENTRATES

| Test No. | Starting Material Constituents, Weight Ratio | Ratio Fe/Cu | Test Data Temperature °C $T_{start}$ | $T_{max}$ | Chlorinated Residue Percent Cu | Fe | S | Volatilized Copper Percent of $Cu_{start}$ | Residue Leach Cu Distribution in: $H_2O$ | HCl | Residue | Soluble Copper: Percent of Cu start ± 2% $Cu^{2+}$ | $Cu^{1+}$ |
|---|---|---|---|---|---|---|---|---|---|---|---|---|---|
| 21 | Concentrate No. I | 6.03 | 308 | 378 | 12.9 | 2.62 | .01 | 7.1 | 99.66 | .24 | 0.04 | 85.0 | 7.9 |
| 22 | | 6.03 | 327 | 382 | 12.7 | 2.30 | .04 | 10.1 | 99.45 | .44 | .04 | 83.8 | 7.9 |
| 23 | | 6.03 | 346 | 393 | 13.0 | 1.90 | .03 | 10.7 | 99.15 | .68 | .07 | 75.2 | 14.1 |
| 24 | | 6.03 | 346 | 396 | 12.7 | 1.80 | .02 | 14.2 | 97.60 | .28 | .04 | 77.2 | 14.2 |
| 25 | | 6.03 | 393 | 442 | 12.5 | 1.40 | .02 | 19.3 | 97.57 | .16 | .04 | 69.8 | 19.3 |
| 26 | Concentrate No. II | .93 | 237 | 327 | 28.1 | 9.17 | .52 | .08 | 91.9 | .09 | 8.04 | 71.1 | 20.7 |
| 27 | | .93 | 266 | 353 | 30.1 | 7.10 | .97 | 1.08 | 96.2 | .18 | 3.63 | 80.6 | 14.7 |
| 28 | | .93 | 285 | 373 | 34.2 | 1.75 | .06 | 1.01 | 99.9 | .11 | .006 | 96.4 | 2.6 |
| 29 | | .93 | 296 | 378 | 33.4 | 2.60 | .06 | 1.05 | 99.9 | .10 | .006 | — | — |
| 30 | | .93 | 297 | 376 | 34.5 | 1.40 | .08 | .90 | 99.9 | .03 | .04 | — | — |
| 31 | | .93 | 310 | 379 | 34.8 | 1.52 | .06 | 1.36 | 99.9 | .07 | .06 | — | — |
| 32 | | .93 | 328 | 409 | 34.6 | 1.35 | .04 | 1.74 | 99.9 | .11 | .006 | — | — |
| 33 | | .93 | 342 | 416 | 34.9 | 1.30 | .12 | 2.30 | 99.9 | .04 | .03 | — | — |
| 34 | | .93 | 374 | 443 | 34.9 | 1.12 | .17 | 3.14 | 100.0 | .01 | .006 | — | — |
| 35 | | .93 | 382 | 454 | 34.4 | 1.10 | .03 | 3.02 | 100.0 | .01 | .006 | — | — |
| 36 | | .93 | 409 | 464 | 34.8 | .90 | .12 | 4.98 | 99.5 | .50 | .03 | 93.9 | 1.2 |
| 37 | Concentrate No. III | .26 | 285 | 396 | 28.7 | — | — | .28 | 99.94 | G2.4.03 | .006 | 100.0 | — |
| 38 | | .26 | 316 | 413 | 28.2 | — | — | .39 | 99.89 | .10 | <.01 | 100.0 | — |
| 39 | | .26 | 335 | 427 | 29.2 | — | — | .23 | 99.86 | .13 | .006 | 100.0 | — |
| 40 | | .26 | 370 | 466 | 29.2 | — | — | 1.03 | 99.97 | .02 | .01 | 100.0 | — |
| 41 | Concentrate No. III +$FeS_2$(1:1) | 1.79 | 320 | 381 | 28.3 | — | — | 2.61 | 99.94 | .05 | .01 | 100.0 | — |

In Table I, the test results for chalcocite ($Cu_2S$) without the addition of a diluent, Nos. 1–4, indicated a decrease of insoluble copper with increasing starting temperature, but in the same direction a decrease of the $Cu^{2+}/Cu^{1+}$ ratio for the soluble copper. Complete chlorination of the copper content to cupric chloride ($CuCl_2$) was achieved by admixing iron pyrite ($FeS_2$), Nos. 5–8. Similar results were obtained for the chlorination of digenite ($Cu_{1.8}S$) and covellite (CuS), Nos. 17–20.

To test the influence of gangue on the case of chlorination, mixtures of chalcocite with smelter heads and tails (gangue), quartz sand, and charcoal were used. The quartz sand was ground to various particle sizes indicated below:

QUARTZ SAND PARTICLE SIZES

| Sample No. | Particle Size, Mesh |
|---|---|
| 1. | −65 |
| 1.1 | +65 |
| 1.2 | −65+100 |
| 1.3 | −100+200 |
| 1.4 | −200 |

For all mixtures and tests with a starting temperature of about 325°C., a complete chlorination to cupric chloride was achieved and more than 99.5 percent of the residual copper was found in the water leach. These results indicate a high influence of the gangue on the completeness of the reaction and on the formation of cupric chloride.

In Table II, the copper sulfide concentrates, Nos. I, II, and III, were successfully chlorinated with starting temperatures between 300°C. and 400°C. to form cupric chloride. Only the chlorinated product of concentrate No. I contained a considerable amount of cuprous chloride for tests with a starting temperature higher than about 350°C. This indicated an upper temperature limit during the reaction of about 380°C. Tests with concentrate No. II, Nos. 26, 27, using starting temperatures of 237°C. and 266°C. yielded incomplete reactions. The leached residue still contained 8.0 and 3.6 percent of the copper values.

The copper concentrates No. I and No. II contained a very small percentage of gangue, and a high percentage of iron; and the copper concentrate No. III contained 7.9 percent iron and a high 30.3 percent gangue. All concentrates, however, showed the same behavior with respect to ease of chlorination. The influence of both iron content and of gangue content on the chlorination is readily apparent.

The test results for the copper concentrates and minerals indicate, furthermore, a close connection between the iron content and the amount of volatilized copper. The admixing of pyrite resulted in a complete chlorination to cupric chloride, and the volatilization of some copper values. For all minerals and concentrates tested, the amount of volatilized copper was proportional to the amount of iron volatilized in the reaction, and was independent of the kind of chlorinated material employed at a given test temperature. A complete chlorination of the copper values to cupric chloride is possible in the presence of either a high iron or a high gangue, sand, or charcoal content. However, increasing the gangue, sand, or charcoal content and decreasing the iron content has the advantage of lowering the percentage of copper volatilized during the reaction.

Whereas this invention is here illustrated and described with respect to certain preferred procedures thereof, it is to be understood that many variations are possible without departing from the inventive concepts particularly pointed out in the claims.

I claim:

1. A process for treating concentrated copper sulfide minerals in substantially dry condition for the recovery of substantially uncontaminated copper values in the form of water-soluble cupric chloride, comprising mixing a copper sulfide mineral concentrate with a diluent material comprising silica, said copper sulfide mineral concentrate initially having a diluent material content, if any, significantly less than a molar ratio of about 1:1 diluent to copper; contacting the mixture with at least a stoichiometric amount of chlorine gas based on the amount of chlorinatable material present in the mixture at a temperature between about 300° and about 400°C., the added diluent material being sufficient in amount to be effective for the formation of a reaction product containing water-soluble cupric chloride, other contaminating chlorides being volatilized during the contacting operation; and recovering substantially uncontaminated cupric chloride from the reaction product by dissolving with water and separating the resulting solution from the remaining solids.

2. A process as set forth in claim 1, wherein the starting temperature of the reaction is between about 300° and about 360°C.

3. A process as set forth in claim 1, wherein the silica is in the form of a ground quartz sand.

4. A process as set forth in claim 1, wherein the chlorine gas is passed in a continuous stream through the mixture in a closed system.

* * * * *